No. 760,572. PATENTED MAY 24, 1904.
R. D. SCOTT.
MACHINE FOR SEASONING LEATHER.
APPLICATION FILED JUNE 27, 1903.
NO MODEL.

Witnesses
C. W. Benjamin
M. Hollingshead

Inventor
R. D. Scott
By his Attorney
T. F. Bourne

THE NORRIS PETERS CO., PHOTO-LITHO., WASHINGTON, D. C.

No. 760,572. Patented May 24, 1904.

UNITED STATES PATENT OFFICE.

RUFUS D. SCOTT, OF BEVERLY, MASSACHUSETTS, ASSIGNOR TO SCOTT LEATHER MACHINE COMPANY, A CORPORATION OF NEW YORK.

MACHINE FOR SEASONING LEATHER.

SPECIFICATION forming part of Letters Patent No. 760,572, dated May 24, 1904.

Application filed June 27, 1903. Serial No. 163,300. (No model.)

*To all whom it may concern:*

Be it known that I, RUFUS D. SCOTT, a citizen of the United States, and a resident of Beverly, Essex county, Massachusetts, have invented certain new and useful Improvements in Machines for Seasoning Leather, of which the following is a specification.

My invention relates to improvements in the class of machines illustrated in my Patent No. 688,035, dated December 3, 1901, for coloring or seasoning leather, wherein the machine is provided with an endless carrier or belt, above which are located means for supplying seasoning or coloring material upon skins placed upon the carrier and also means for rubbing the seasoning material upon the skins. In that class of machines there is danger that the coloring or seasoning material may become more or less spread upon the carrier and thereby be transferred to the flesh side of skins placed upon the carrier.

The object of my invention is to provide an improved scraper to coact with the carrier or apron to remove from the latter the seasoning or coloring material that may collect thereon during operation, and in carrying out my invention I provide a scraper adapted to extend transversely of the carrier and in contact therewith, means for movably supporting said scraper, so that it may have movement toward the carrier, and means for normally holding the scraper in contact with the carrier, whereby as the scraper becomes worn it will be kept in proper contact with the carrier at all times.

The invention further embraces the novel details of improvement that will be more fully hereinafter set forth and then pointed out in the claims.

Reference is to be had to the accompanying drawings, forming part hereof, wherein—

Figure 1:
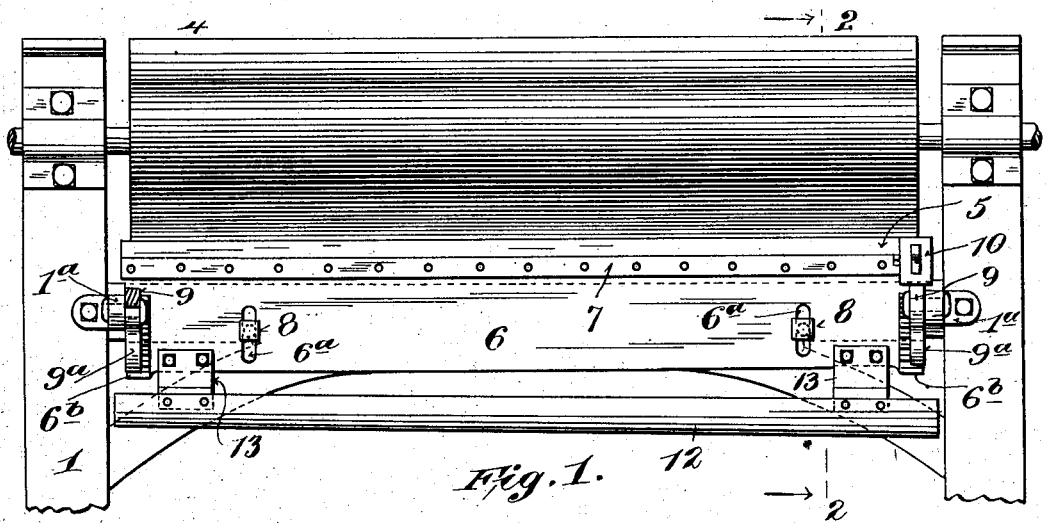
Figure 2:
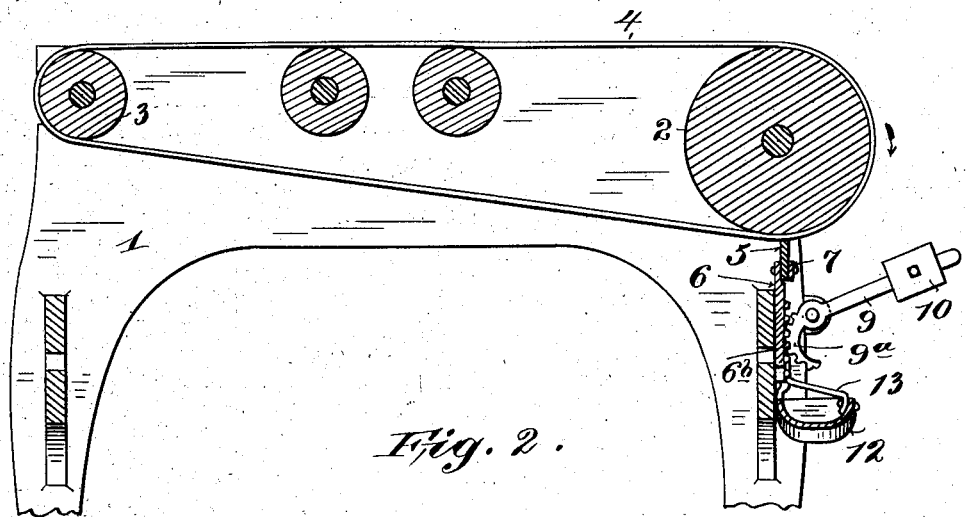
Figures 3, 4:
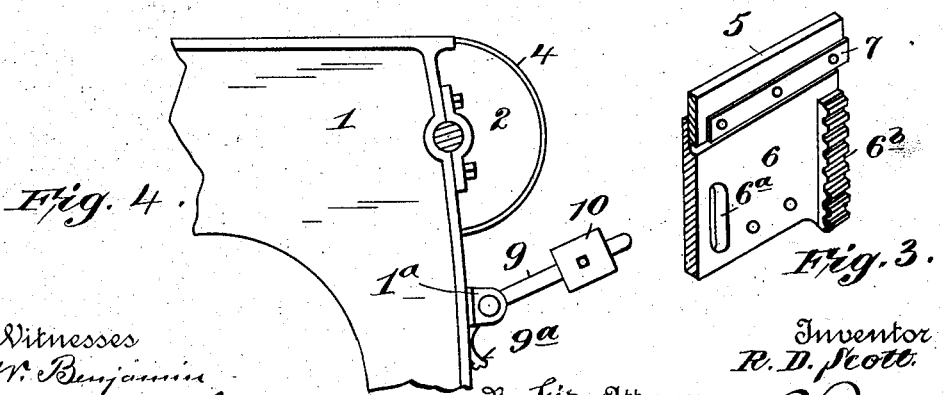

Figure 1 is an end view of part of a leather coloring or seasoning machine provided with my improvements, one of the levers of the latter being partly broken away. Fig. 2 is a vertical section on the line 2 2 in Fig. 1, looking in the direction of the arrows. Fig. 3 is a detail perspective view of the scraper and connected parts, and Fig. 4 is a side view of a portion of the machine looking from the left in Fig. 1.

Similar numerals of reference indicate corresponding parts in the several views.

The numeral 1 in the drawings indicates the frame of the machine, which may be of any suitable construction, and 2 3 indicate rollers or drums mounted upon shafts to rotate in said frame, and at 4 is indicated an endless carrier, shown in the form of an apron or belt, mounted upon said rollers. Suitable means may be provided for rotating the rollers to operate the carrier—such, for instance, as shown in my said patent. The skins to be operated upon are placed upon the carrier 4, and the latter moves in the direction of the arrow in Fig. 2, and above the carrier means are provided for applying, coloring, or seasoning material upon the skins laid on the carrier and for rubbing the mixture upon and into the skins, which means may be similar to that shown in my said patent and form no part of my present invention.

At 5 is indicated a scraper adapted to bear against the carrier 4 to scrape seasoning or coloring material therefrom as the carrier travels, as indicated in Fig. 2. The scraper 5 may be made of rubber, leather, or other suitable material and is shown in the form of a long narrow strip placed on edge, so that one edge bears against the carrier 4, and said scraper is secured to a bar 6, that is supported by frame 1, so as to have movement toward and from the carrier. The scraper 5 is shown held between the bar 6 and a strip 7, lying against the lower part of the scraper, rivets or screws passing through said parts, whereby the scraper is firmly clamped to said bar. The means I have shown for supporting the bar 6 on frame 1, so that the bar may have lateral movement, comprise bolts or screws 8, which pass through vertically-disposed slots $6^a$ in said bar and are secured to said frame. Means are provided for maintaining the scraper 5 normally in contact with carrier 4, and to this end I have shown arms or levers 9, supported by brackets $1^a$ on frame 1 and provided with adjustable weights 10, which arms have segmental racks $9^a$ meshing with racks 6ᵇ, carried near opposite ends of bar 6, the arrangement being such that the weighted arms in connection with the racks normally tend to move the bar 6 and scraper 5 toward carrier 4, thereby to maintain the scraper in contact with the carrier.

At 12 is indicated a trough or receiver for the surplus material scraped from carrier 4, which trough is shown in Fig. 1 as inclined from one end to the other and may be provided with apertures in the bottom, if desired, for the ready passage of the seasoning material, or the latter may pass from the lower end of the trough into any suitable receptacle. While the trough may be supported in suitable manner, I have shown the same connected to bar 6 by means of strips or arms 13, suitably secured to the bar and trough, the trough thus coming under said bar in position to receive the material that may run down along the bar and drop therefrom.

By means of my improvements the scraper 5 is normally maintained in proper operative position in contact with carrier 4, and as the scraper is worn away by the movement of the carrier in contact therewith the arms and racks keep pushing the scraper up and holding it against the carrier, whereby the efficiency of the scraper is greatly increased, thereby overcoming the danger of seasoning material passing beyond the scraper along the carrier after the scraper has become worn, as is liable to occur with a stationary scraper, as shown in my said patent. Furthermore, when the carrier 4 is to be removed or replaced the scraper can be readily moved away from the carrier by merely lifting the arms 9.

It is obvious that my improved scraper can operate directly upon the drum or roller 2 for cleaning the same if the carrier were removed or not used, and my invention is not limited to the details of construction shown, as they may be varied without departing from the spirit thereof.

Having now described my invention, what I claim is—

1. The combination of a carrier, with a scraper, a bar carrying the scraper, means for guiding the bar, a rack connected with the bar, and an arm having a rack coacting with the first-mentioned rack and weighted to normally maintain the scraper in contact with the carrier, substantially as described.

2. The combination of a carrier, with a scraper, a bar carrying the same, means for movably supporting and guiding said bar to hold the scraper against the carrier, racks carried near opposite ends of the bar, arms pivotally supported near opposite ends of the bar and coacting with the racks on the bar to press the scraper toward the carrier, and weights operating on said arms, substantially as described.

3. The combination of a pair of rollers, an endless carrier mounted upon the same, a scraper located beneath the carrier in contact with the under surface thereof, means for movably supporting and guiding the scraper, a rack connected with said scraper, and an arm having a rack coacting with the first-named rack and weighted to normally maintain the scraper in contact with the carrier, substantially as described.

RUFUS D. SCOTT.

Witnesses:
Wm. J. Emmay,
Saml. H. Stone.